US012713037B2

(12) United States Patent
Gao et al.

(10) Patent No.: US 12,713,037 B2
(45) Date of Patent: Aug. 18, 2026

(54) OVERLAPPED OPTICAL FLOW-BASED MOTION VECTOR REFINEMENT WITH ADAPTIVE SUBBLOCK SIZE

(71) Applicant: Tencent America LLC, Palo Alto, CA (US)

(72) Inventors: Han Gao, Palo Alto, CA (US); Xin Zhao, Palo Alto, CA (US); Liang Zhao, Palo Alto, CA (US); Shan Liu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 18/805,299

(22) Filed: Aug. 14, 2024

(65) Prior Publication Data

US 2025/0294170 A1 Sep. 18, 2025

Related U.S. Application Data

(60) Provisional application No. 63/566,810, filed on Mar. 18, 2024.

(51) Int. Cl.

| | |
|---|---|
| ***H04N 19/176*** | (2014.01) |
| ***H04N 19/513*** | (2014.01) |
| ***H04N 19/563*** | (2014.01) |

(52) U.S. Cl.
CPC ......... *H04N 19/176* (2014.11); *H04N 19/513* (2014.11); *H04N 19/563* (2014.11)

(58) Field of Classification Search
None
See application file for complete search history.

(56) References Cited

U.S. PATENT DOCUMENTS

2020/0304805 A1* 9/2020 Li .......................... H04N 19/54
2021/0392370 A1* 12/2021 Lim ..................... H04N 19/577
2024/0129525 A1* 4/2024 Zhang .................. H04N 19/186
2024/0357122 A1* 10/2024 Chen .................... H04N 19/137
2025/0080747 A1* 3/2025 Zhang .................... H04N 19/52

* cited by examiner

*Primary Examiner* — Jessica M Prince
(74) *Attorney, Agent, or Firm* — Morgan, Lewis & Bockius LLP

(57) ABSTRACT

An example method of video coding includes receiving a video bitstream comprising a plurality of blocks. The method also includes deriving a set of subblock motion vectors for a current block of the plurality of blocks and deriving a set of refined subblock motion vectors for the current block by applying an optical flow refinement on a set of subblocks of the current block. The respective sizes of the set of subblocks are adaptively selected for the optical flow refinement. The method further includes reconstructing the current block using the set of refined subblock motion vectors.

19 Claims, 7 Drawing Sheets

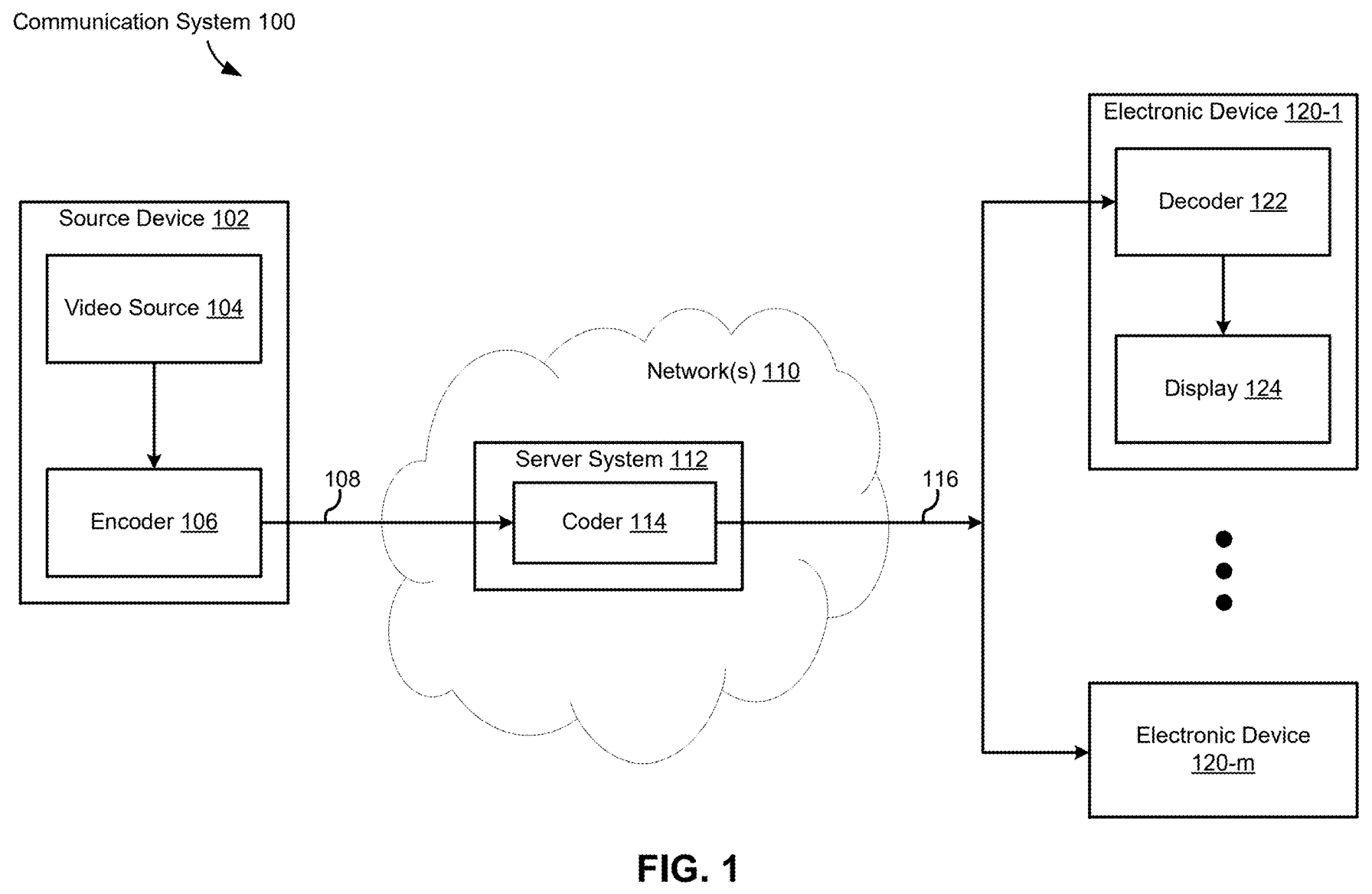

Communication System 100

Source Device 102

Video Source 104

Encoder 106

108

Network(s) 110

Server System 112

Coder 114

116

Electronic Device 120-1

Decoder 122

Display 124

Electronic Device 120-m

FIG. 1

OVERLAPPED OPTICAL FLOW-BASED MOTION VECTOR REFINEMENT WITH ADAPTIVE SUBBLOCK SIZE

RELATED APPLICATIONS

This application claims priority to U.S. Provisional Patent Application No. 63/566,810, entitled "Overlapped Optical Flow-Based Motion Vector Refinement with Adaptive Subblock Size" filed Mar. 18, 2024, which is hereby incorporated by reference in its entirety.

TECHNICAL FIELD

The disclosed embodiments relate generally to video coding, including but not limited to systems and methods for refining motion vectors using subblocks of varying sizes.

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit and receive or otherwise communicate digital video data across a communication network, and/or store the digital video data on a storage device. Due to a limited bandwidth capacity of the communication network and limited memory resources of the storage device, video coding may be used to compress the video data according to one or more video coding standards before it is communicated or stored. The video coding can be performed by hardware and/or software on an electronic/client device or a server providing a cloud service.

Video coding generally utilizes prediction methods (e.g., inter-prediction, intra-prediction, or the like) that take advantage of redundancy inherent in the video data. Video coding aims to compress video data into a form that uses a lower bit rate, while avoiding or minimizing degradations to video quality. Multiple video codec standards have been developed. For example, High-Efficiency Video Coding (HEVC/H.265) is a video compression standard designed as part of the MPEG-H project. ITU-T and ISO/IEC published the HEVC/H.265 standard in 2013 (version 1), 2014 (version 2), 2015 (version 3), and 2016 (version 4). Versatile Video Coding (VVC/H.266) is a video compression standard intended as a successor to HEVC. ITU-T and ISO/IEC published the VVC/H.266 standard in 2020 (version 1) and 2022 (version 2). AOMedia Video 1 (AV1) is an open video coding format designed as an alternative to HEVC. On Jan. 8, 2019, a validated version 1.0.0 with Errata 1 of the specification was released.

SUMMARY

The present disclosure describes, amongst other things, a set of techniques for video (image) compression related to optical flow-based motion vector refinement. The set of techniques include techniques for overlapped optical flow-based motion vector refinement. For example, when computing the subblock refined motion vectors of the optical flow refinement, subblock sizes may be adaptively selected. An advantage of adapting the subblock sizes for optical flow refinement is having more samples for the optical refinement, which improves the accuracy of the motion vectors (e.g., without additional cost), thereby improving the coding accuracy.

In accordance with some embodiments, a method of video decoding includes: (i) receiving a video bitstream (e.g., a coded video sequence) comprising a plurality of blocks (e.g., corresponding to one or more pictures); (ii) deriving a set of subblock motion vectors for a current block of the plurality of blocks; (iii) deriving a set of refined subblock motion vectors for the current block by applying an optical flow refinement on a set of subblocks of the current block, wherein respective sizes of the set of subblocks are adaptively selected for the optical flow refinement; and (iv) reconstructing the current block using the set of refined subblock motion vectors.

In accordance with some embodiments, a method of video encoding includes (i) receiving video data (e.g., a source video sequence) comprising a plurality of blocks (e.g., corresponding to one or more pictures) including a current block; (ii) identifying a set of subblock motion vectors for the current block; (iii) identifying a set of refined subblock motion vectors for the current block by applying an optical flow refinement on a set of subblocks of the current block, where respective sizes of the set of subblocks are adaptively selected for the optical flow refinement; and (iv) encoding the current block using the set of refined subblock motion vectors.

In accordance with some embodiments, a computing system is provided, such as a streaming system, a server system, a personal computer system, or other electronic device. The computing system includes control circuitry and memory storing one or more sets of instructions. The one or more sets of instructions including instructions for performing any of the methods described herein. In some embodiments, the computing system includes an encoder component and a decoder component (e.g., a transcoder). In accordance with some embodiments, a non-transitory computer-readable storage medium is provided. The non-transitory computer-readable storage medium stores one or more sets of instructions for execution by a computing system. The one or more sets of instructions including instructions for performing any of the methods described herein.

Thus, devices and systems are disclosed with methods for encoding and decoding video. Such methods, devices, and systems may complement or replace conventional methods, devices, and systems for video encoding/decoding.

The features and advantages described in the specification are not necessarily all-inclusive and, in particular, some additional features and advantages will be apparent to one of ordinary skill in the art in view of the drawings, specification, and claims provided in this disclosure. Moreover, it should be noted that the language used in the specification has been principally selected for readability and instructional purposes and has not necessarily been selected to delineate or circumscribe the subject matter described herein.

BRIEF DESCRIPTION OF THE DRAWINGS

So that the present disclosure can be understood in greater detail, a more particular description can be had by reference to the features of various embodiments, some of which are illustrated in the appended drawings. The appended drawings, however, merely illustrate pertinent features of the present disclosure and are therefore not necessarily to be considered limiting, for the description can admit to other effective features as the person of skill in this art will appreciate upon reading this disclosure.

FIG. 1 is a block diagram illustrating an example communication system in accordance with some embodiments.

In accordance with common practice, the various features illustrated in the drawings are not necessarily drawn to scale, and like reference numerals can be used to denote like features throughout the specification and figures.

DETAILED DESCRIPTION

Figure 2A:
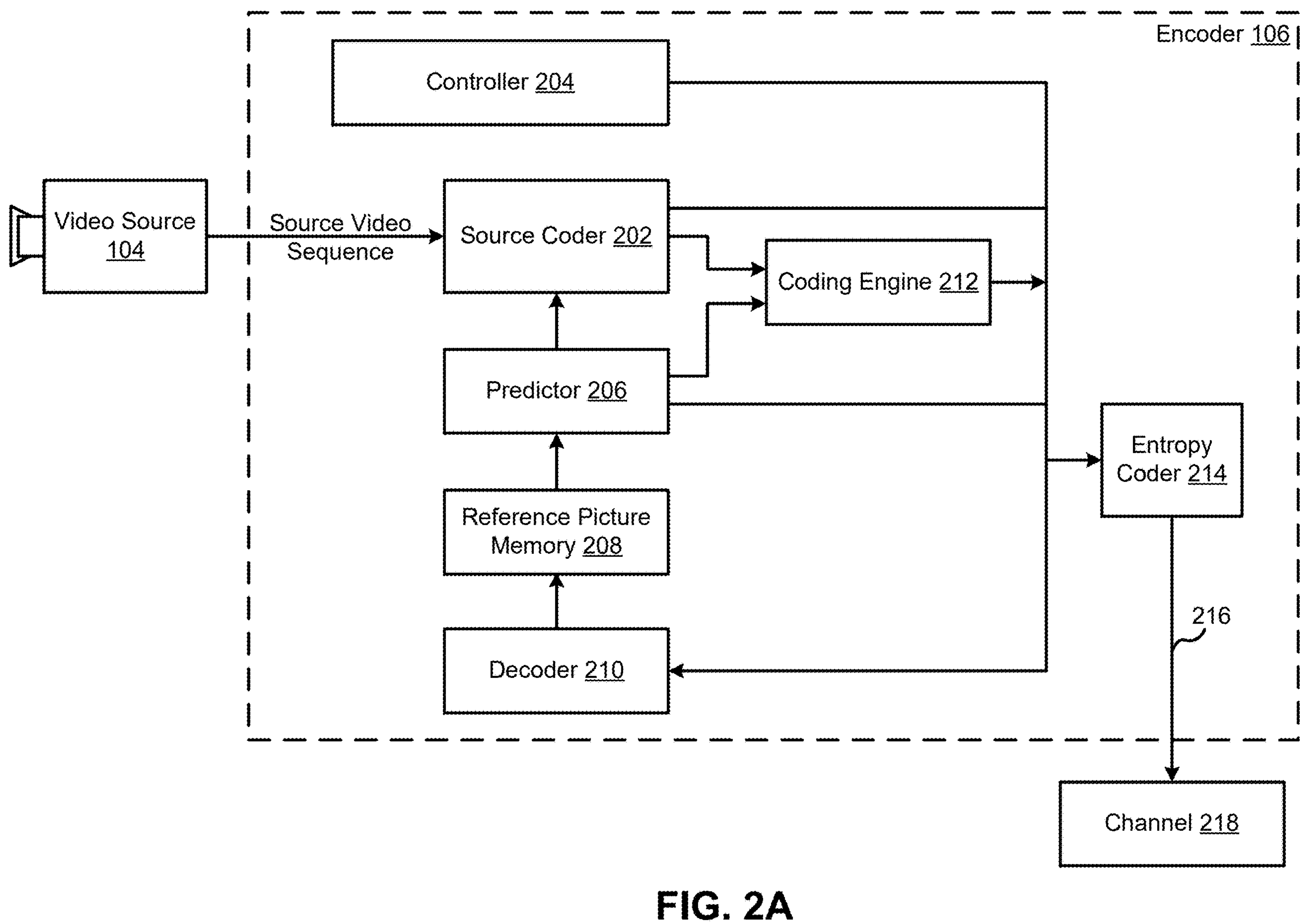
FIG. 2A is a block diagram illustrating example elements of an encoder component in accordance with some embodiments.

The present disclosure describes video/image compression techniques including temporal motion vector prediction (TMVP) and decoder side motion vector refinement (DMVR). The TMVP techniques include subblock-based TMVP that uses motion information at a subblock-level from a collocated reference picture. The DMVR techniques include applying bilateral matching to refine an input motion vector pair and using the refined motion vector pair for a motion compensated prediction of components. The techniques described herein also include bi-directional optical flow (BDOF) refinement. BDOF refinement can be used to refine the bi-prediction signal of a coding block at a subblock level. The present disclosure further describes deriving a set of refined subblock motion vectors for a current block by applying an optical flow refinement (e.g., BDOF) on a set of subblocks of the current block. For the optical flow refinement process, respective sizes of the set of subblocks are adaptively selected. For example, the respective sizes may be predefined, derived, or signaled. Using adaptive subblock sizes allows for more samples to be used with the optical flow refinement, which improves the accuracy of the refined motion vectors, thereby improving the coding accuracy.

Example Systems and Devices

FIG. 1 is a block diagram illustrating a communication system 100 in accordance with some embodiments. The communication system 100 includes a source device 102 and a plurality of electronic devices 120 (e.g., electronic device 120-1 to electronic device **120-*m*) that are communicatively coupled to one another via one or more networks. In some embodiments, the communication system 100** is a streaming system, e.g., for use with video-enabled applications such as video conferencing applications, digital TV applications, and media storage and/or distribution applications.

The source device 102 includes a video source 104 (e.g., a camera component or media storage) and an encoder component 106. In some embodiments, the video source 104 is a digital camera (e.g., configured to create an uncompressed video sample stream). The encoder component 106 generates one or more encoded video bitstreams from the video stream. The video stream from the video source 104 may be high data volume as compared to the encoded video bitstream 108 generated by the encoder component 106. Because the encoded video bitstream 108 is lower data volume (less data) as compared to the video stream from the video source, the encoded video bitstream 108 requires less bandwidth to transmit and less storage space to store as compared to the video stream from the video source 104. In some embodiments, the source device 102 does not include the encoder component 106 (e.g., is configured to transmit uncompressed video to the network(s) 110).

The one or more networks 110 represents any number of networks that convey information between the source device 102, the server system 112, and/or the electronic devices 120, including for example wireline (wired) and/or wireless communication networks. The one or more networks 110 may exchange data in circuit-switched and/or packet-switched channels. Representative networks include telecommunications networks, local area networks, wide area networks and/or the Internet.

The one or more networks 110 include a server system 112 (e.g., a distributed/cloud computing system). In some embodiments, the server system 112 is, or includes, a streaming server (e.g., configured to store and/or distribute video content such as the encoded video stream from the source device 102). The server system 112 includes a coder component 114 (e.g., configured to encode and/or decode video data). In some embodiments, the coder component 114 includes an encoder component and/or a decoder component. In various embodiments, the coder component 114 is instantiated as hardware, software, or a combination thereof. In some embodiments, the coder component 114 is configured to decode the encoded video bitstream 108 and re-encode the video data using a different encoding standard and/or methodology to generate encoded video data 116. In some embodiments, the server system 112 is configured to generate multiple video formats and/or encodings from the encoded video bitstream 108. In some embodiments, the server system 112 functions as a Media-Aware Network Element (MANE). For example, the server system 112 may be configured to prune the encoded video bitstream 108 for tailoring potentially different bitstreams to one or more of the electronic devices 120. In some embodiments, a MANE is provided separate from the server system 112.

The electronic device 120-1 includes a decoder component 122 and a display 124. In some embodiments, the decoder component 122 is configured to decode the encoded video data 116 to generate an outgoing video stream that can be rendered on a display or other type of rendering device. In some embodiments, one or more of the electronic devices 120 does not include a display component (e.g., is communicatively coupled to an external display device and/or includes a media storage). In some embodiments, the electronic devices 120 are streaming clients. In some embodiments, the electronic devices 120 are configured to access the server system 112 to obtain the encoded video data 116.

The source device and/or the plurality of electronic devices 120 are sometimes referred to as "terminal devices"

or "user devices." In some embodiments, the source device 102 and/or one or more of the electronic devices 120 are instances of a server system, a personal computer, a portable device (e.g., a smartphone, tablet, or laptop), a wearable device, a video conferencing device, and/or other type of electronic device.

In example operation of the communication system 100, the source device 102 transmits the encoded video bitstream 108 to the server system 112. For example, the source device 102 may code a stream of pictures that are captured by the source device. The server system 112 receives the encoded video bitstream 108 and may decode and/or encode the encoded video bitstream 108 using the coder component 114. For example, the server system 112 may apply an encoding to the video data that is more optimal for network transmission and/or storage. The server system 112 may transmit the encoded video data 116 (e.g., one or more coded video bitstreams) to one or more of the electronic devices 120. Each electronic device 120 may decode the encoded video data 116 and optionally display the video pictures.

FIG. 2A is a block diagram illustrating example elements of the encoder component 106 in accordance with some embodiments. The encoder component 106 receives video data (e.g., a source video sequence) from the video source 104. In some embodiments, the encoder component includes a receiver (e.g., a transceiver) component configured to receive the source video sequence. In some embodiments, the encoder component 106 receives a video sequence from a remote video source (e.g., a video source that is a component of a different device than the encoder component 106). The video source 104 may provide the source video sequence in the form of a digital video sample stream that can be of any suitable bit depth (e.g., 8-bit, 10-bit, or 12-bit), any colorspace (e.g., BT.601 Y CrCB, or RGB), and any suitable sampling structure (e.g., Y CrCb 4:2:0 or Y CrCb 4:4:4). In some embodiments, the video source 104 is a storage device storing previously captured/prepared video. In some embodiments, the video source 104 is camera that captures local image information as a video sequence. Video data may be provided as a plurality of individual pictures that impart motion when viewed in sequence. The pictures themselves may be organized as a spatial array of pixels, where each pixel can include one or more samples depending on the sampling structure, color space, etc. in use. A person of ordinary skill in the art can readily understand the relationship between pixels and samples.

The encoder component 106 is configured to code and/or compress the pictures of the source video sequence into a coded video sequence 216 in real-time or under other time constraints as required by the application. In some embodiments, the encoder component 106 is configured to perform a conversion between the source video sequence and a bitstream of visual media data (e.g., a video bitstream). Enforcing appropriate coding speed is one function of a controller 204. In some embodiments, the controller 204 controls other functional units as described below and is functionally coupled to the other functional units. Parameters set by the controller 204 may include rate-control-related parameters (e.g., picture skip, quantizer, and/or lambda value of rate-distortion optimization techniques), picture size, group of pictures (GOP) layout, maximum motion vector search range, and so forth. A person of ordinary skill in the art can readily identify other functions of controller 204 as they may pertain to the encoder component 106 being optimized for a certain system design.

In some embodiments, the encoder component 106 is configured to operate in a coding loop. In a simplified example, the coding loop includes a source coder 202 (e.g., responsible for creating symbols, such as a symbol stream, based on an input picture to be coded and reference picture(s)), and a (local) decoder 210. The decoder 210 reconstructs the symbols to create the sample data in a similar manner as a (remote) decoder (when compression between symbols and coded video bitstream is lossless). The reconstructed sample stream (sample data) is input to the reference picture memory 208. As the decoding of a symbol stream leads to bit-exact results independent of decoder location (local or remote), the content in the reference picture memory 208 is also bit exact between the local encoder and remote encoder. In this way, the prediction part of an encoder interprets as reference picture samples the same sample values as a decoder would interpret when using prediction during decoding.

The operation of the decoder 210 can be the same as of a remote decoder, such as the decoder component 122, which is described in detail below in conjunction with FIG. 2B. Briefly referring to FIG. 2B, however, as symbols are available and encoding/decoding of symbols to a coded video sequence by an entropy coder 214 and the parser 254 can be lossless, the entropy decoding parts of the decoder component 122, including the buffer memory 252 and the parser 254 may not be fully implemented in the local decoder 210.

The decoder technology described herein, except the parsing/entropy decoding, may be to be present, in substantially identical functional form, in a corresponding encoder. For this reason, the disclosed subject matter focuses on decoder operation. Additionally, the description of encoder technologies can be abbreviated as they may be the inverse of the decoder technologies.

As part of its operation, the source coder 202 may perform motion compensated predictive coding, which codes an input frame predictively with reference to one or more previously-coded frames from the video sequence that were designated as reference frames. In this manner, the coding engine 212 codes differences between pixel blocks of an input frame and pixel blocks of reference frame(s) that may be selected as prediction reference(s) to the input frame. The controller 204 may manage coding operations of the source coder 202, including, for example, setting of parameters and subgroup parameters used for encoding the video data.

The decoder 210 decodes coded video data of frames that may be designated as reference frames, based on symbols created by the source coder 202. Operations of the coding engine 212 may advantageously be lossy processes. When the coded video data is decoded at a video decoder (not shown in FIG. 2A), the reconstructed video sequence may be a replica of the source video sequence with some errors. The decoder 210 replicates decoding processes that may be performed by a remote video decoder on reference frames and may cause reconstructed reference frames to be stored in the reference picture memory 208. In this manner, the encoder component 106 stores copies of reconstructed reference frames locally that have common content as the reconstructed reference frames that will be obtained by a remote video decoder (absent transmission errors).

The predictor 206 may perform prediction searches for the coding engine 212. That is, for a new frame to be coded, the predictor 206 may search the reference picture memory 208 for sample data (as candidate reference pixel blocks) or certain metadata such as reference picture motion vectors, block shapes, and so on, that may serve as an appropriate prediction reference for the new pictures. The predictor 206 may operate on a sample block-by-pixel block basis to find appropriate prediction references. As determined by search results obtained by the predictor 206, an input picture may have prediction references drawn from multiple reference pictures stored in the reference picture memory 208.

Output of all aforementioned functional units may be subjected to entropy coding in the entropy coder 214. The entropy coder 214 translates the symbols as generated by the various functional units into a coded video sequence, by losslessly compressing the symbols according to technologies known to a person of ordinary skill in the art (e.g., Huffman coding, variable length coding, and/or arithmetic coding).

In some embodiments, an output of the entropy coder 214 is coupled to a transmitter. The transmitter may be configured to buffer the coded video sequence(s) as created by the entropy coder 214 to prepare them for transmission via a communication channel 218, which may be a hardware/software link to a storage device which would store the encoded video data. The transmitter may be configured to merge coded video data from the source coder 202 with other data to be transmitted, for example, coded audio data and/or ancillary data streams (sources not shown). In some embodiments, the transmitter may transmit additional data with the encoded video. The source coder 202 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and the like.

The controller 204 may manage operation of the encoder component 106. During coding, the controller 204 may assign to each coded picture a certain coded picture type, which may affect the coding techniques that are applied to the respective picture. For example, pictures may be assigned as an Intra Picture (I picture), a Predictive Picture (P picture), or a Bi-directionally Predictive Picture (B Picture). An Intra Picture may be coded and decoded without using any other frame in the sequence as a source of prediction. Some video codecs allow for different types of Intra pictures, including, for example Independent Decoder Refresh (IDR) Pictures. A person of ordinary skill in the art is aware of those variants of I pictures and their respective applications and features, and therefore they are not repeated here. A Predictive picture may be coded and decoded using intra prediction or inter prediction using at most one motion vector and reference index to predict the sample values of each block. A Bi-directionally Predictive Picture may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

The encoder component 106 may perform coding operations according to a predetermined video coding technology or standard, such as any described herein. In its operation, the encoder component 106 may perform various compression operations, including predictive coding operations that exploit temporal and spatial redundancies in the input video sequence. The coded video data, therefore, may conform to a syntax specified by the video coding technology or standard being used.

Figure 2B:
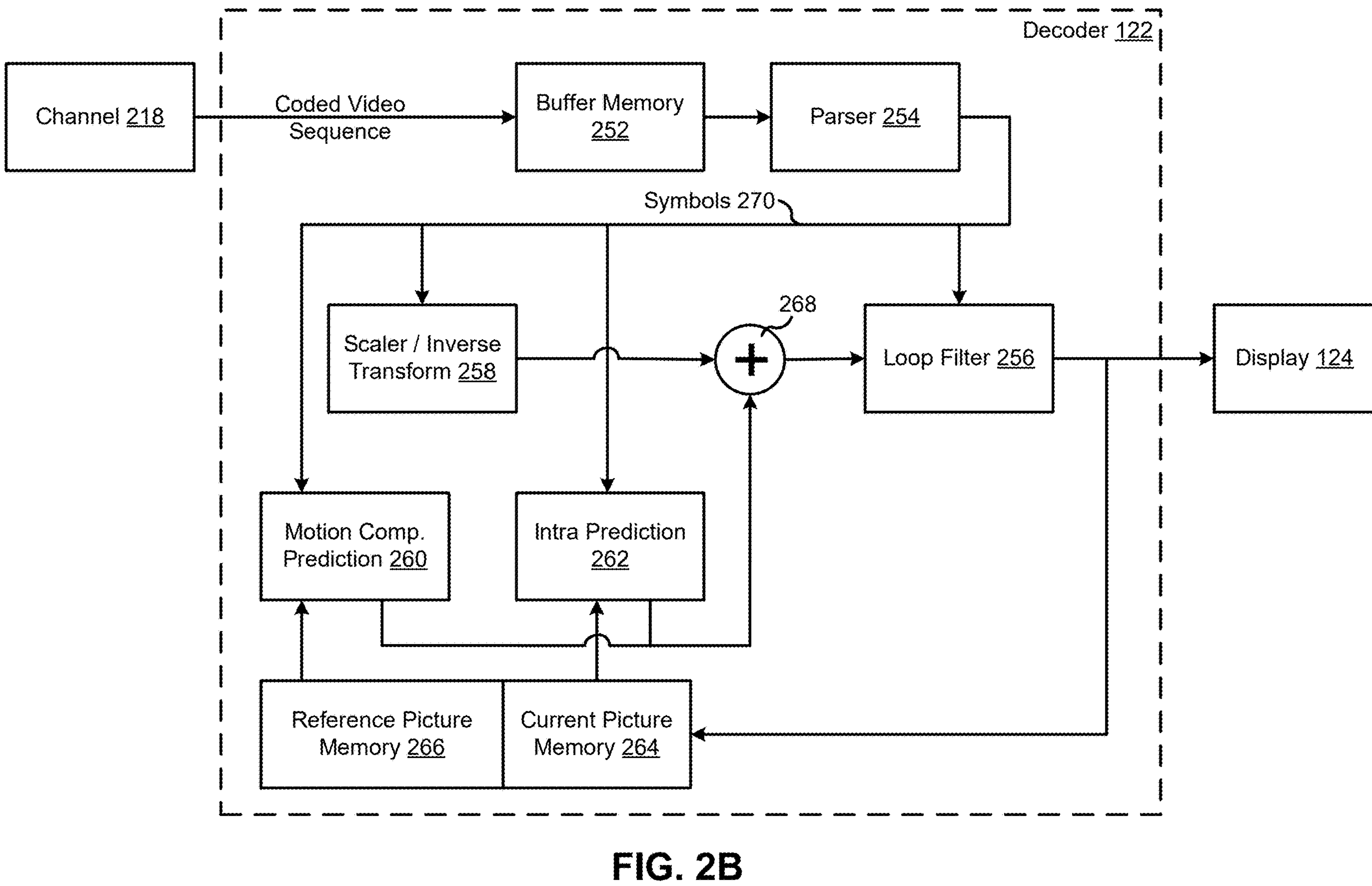
FIG. 2B is a block diagram illustrating example elements of a decoder component in accordance with some embodiments.

FIG. 2B is a block diagram illustrating example elements of the decoder component 122 in accordance with some embodiments. The decoder component 122 in FIG. 2B is coupled to the channel 218 and the display 124. In some embodiments, the decoder component 122 includes a transmitter coupled to the loop filter 256 and configured to transmit data to the display 124 (e.g., via a wired or wireless connection).

In some embodiments, the decoder component 122 includes a receiver coupled to the channel 218 and configured to receive data from the channel 218 (e.g., via a wired or wireless connection). The receiver may be configured to receive one or more coded video sequences to be decoded by the decoder component 122. In some embodiments, the decoding of each coded video sequence is independent from other coded video sequences. Each coded video sequence may be received from the channel 218, which may be a hardware/software link to a storage device which stores the encoded video data. The receiver may receive the encoded video data with other data, for example, coded audio data and/or ancillary data streams, that may be forwarded to their respective using entities (not depicted). The receiver may separate the coded video sequence from the other data. In some embodiments, the receiver receives additional (redundant) data with the encoded video. The additional data may be included as part of the coded video sequence(s). The additional data may be used by the decoder component 122 to decode the data and/or to more accurately reconstruct the original video data. Additional data can be in the form of, e.g., temporal, spatial, or SNR enhancement layers, redundant slices, redundant pictures, forward error correction codes, and so on.

In accordance with some embodiments, the decoder component 122 includes a buffer memory 252, a parser 254 (also sometimes referred to as an entropy decoder), a scaler/inverse transform unit 258, an intra picture prediction unit 262, a motion compensation prediction unit 260, an aggregator 268, the loop filter unit 256, a reference picture memory 266, and a current picture memory 264. In some embodiments, the decoder component 122 is implemented as an integrated circuit, a series of integrated circuits, and/or other electronic circuitry. The decoder component 122 may be implemented at least in part in software.

The buffer memory 252 is coupled in between the channel 218 and the parser 254 (e.g., to combat network jitter). In some embodiments, the buffer memory 252 is separate from the decoder component 122. In some embodiments, a separate buffer memory is provided between the output of the channel 218 and the decoder component 122. In some embodiments, a separate buffer memory is provided outside of the decoder component 122 (e.g., to combat network jitter) in addition to the buffer memory 252 inside the decoder component 122 (e.g., which is configured to handle playout timing). When receiving data from a store/forward device of sufficient bandwidth and controllability, or from an isosynchronous network, the buffer memory 252 may not be needed, or can be small. For use on best effort packet networks such as the Internet, the buffer memory 252 may be required, can be comparatively large and/or of adaptive size, and may at least partially be implemented in an operating system or similar elements outside of the decoder component 122.

The parser 254 is configured to reconstruct symbols 270 from the coded video sequence. The symbols may include, for example, information used to manage operation of the decoder component 122, and/or information to control a rendering device such as the display 124. The control information for the rendering device(s) may be in the form of, for example, Supplementary Enhancement Information (SEI) messages or Video Usability Information (VUI) parameter set fragments (not depicted). The parser 254 parses (entropy-decodes) the coded video sequence. The coding of the coded video sequence can be in accordance with a video coding technology or standard, and can follow principles well known to a person skilled in the art, including variable length coding, Huffman coding, arithmetic coding with or without context sensitivity, and so forth. The parser 254 may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser 254 may also extract, from the coded video sequence, information such as transform coefficients, quantizer parameter values, motion vectors, and so forth.

Reconstruction of the symbols 270 can involve multiple different units depending on the type of the coded video picture or parts thereof (such as: inter and intra picture, inter and intra block), and other factors. Which units are involved, and how they are involved, can be controlled by the subgroup control information that was parsed from the coded video sequence by the parser 254. The flow of such subgroup control information between the parser 254 and the multiple units below is not depicted for clarity.

The decoder component 122 can be conceptually subdivided into a number of functional units, and in some implementations, these units interact closely with each other and can, at least partly, be integrated into each other. However, for clarity, the conceptual subdivision of the functional units is maintained herein.

The scaler/inverse transform unit 258 receives quantized transform coefficients as well as control information (such as which transform to use, block size, quantization factor, and/or quantization scaling matrices) as symbol(s) 270 from the parser 254. The scaler/inverse transform unit 258 can output blocks including sample values that can be input into the aggregator 268. In some cases, the output samples of the scaler/inverse transform unit 258 pertain to an intra coded block; that is: a block that is not using predictive information from previously reconstructed pictures, but can use predictive information from previously reconstructed parts of the current picture. Such predictive information can be provided by the intra picture prediction unit 262. The intra picture prediction unit 262 may generate a block of the same size and shape as the block under reconstruction, using surrounding already-reconstructed information fetched from the current (partly reconstructed) picture from the current picture memory 264. The aggregator 268 may add, on a per sample basis, the prediction information the intra picture prediction unit 262 has generated to the output sample information as provided by the scaler/inverse transform unit 258.

In other cases, the output samples of the scaler/inverse transform unit 258 pertain to an inter coded, and potentially motion-compensated, block. In such cases, the motion compensation prediction unit 260 can access the reference picture memory 266 to fetch samples used for prediction. After motion compensating the fetched samples in accordance with the symbols 270 pertaining to the block, these samples can be added by the aggregator 268 to the output of the scaler/inverse transform unit 258 (in this case called the residual samples or residual signal) so to generate output sample information. The addresses within the reference picture memory 266, from which the motion compensation prediction unit 260 fetches prediction samples, may be controlled by motion vectors. The motion vectors may be available to the motion compensation prediction unit 260 in the form of symbols 270 that can have, for example, X, Y, and reference picture components. Motion compensation may also include interpolation of sample values as fetched from the reference picture memory 266, e.g., when sub-sample exact motion vectors are in use, motion vector prediction mechanisms.

The output samples of the aggregator 268 can be subject to various loop filtering techniques in the loop filter unit 256. Video compression technologies can include in-loop filter technologies that are controlled by parameters included in the coded video bitstream and made available to the loop filter unit 256 as symbols 270 from the parser 254, but can also be responsive to meta-information obtained during the decoding of previous (in decoding order) parts of the coded picture or coded video sequence, as well as responsive to previously reconstructed and loop-filtered sample values. The output of the loop filter unit 256 can be a sample stream that can be output to a render device such as the display 124, as well as stored in the reference picture memory 266 for use in future inter-picture prediction.

Certain coded pictures, once reconstructed, can be used as reference pictures for future prediction. Once a coded picture is reconstructed and the coded picture has been identified as a reference picture (by, for example, parser 254), the current reference picture can become part of the reference picture memory 266, and a fresh current picture memory can be reallocated before commencing the reconstruction of the following coded picture.

The decoder component 122 may perform decoding operations according to a predetermined video compression technology that may be documented in a standard, such as any of the standards described herein. The coded video sequence may conform to a syntax specified by the video compression technology or standard being used, in the sense that it adheres to the syntax of the video compression technology or standard, as specified in the video compression technology document or standard and specifically in the profiles document therein. Also, for compliance with some video compression technologies or standards, the complexity of the coded video sequence may be within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

Figure 3:
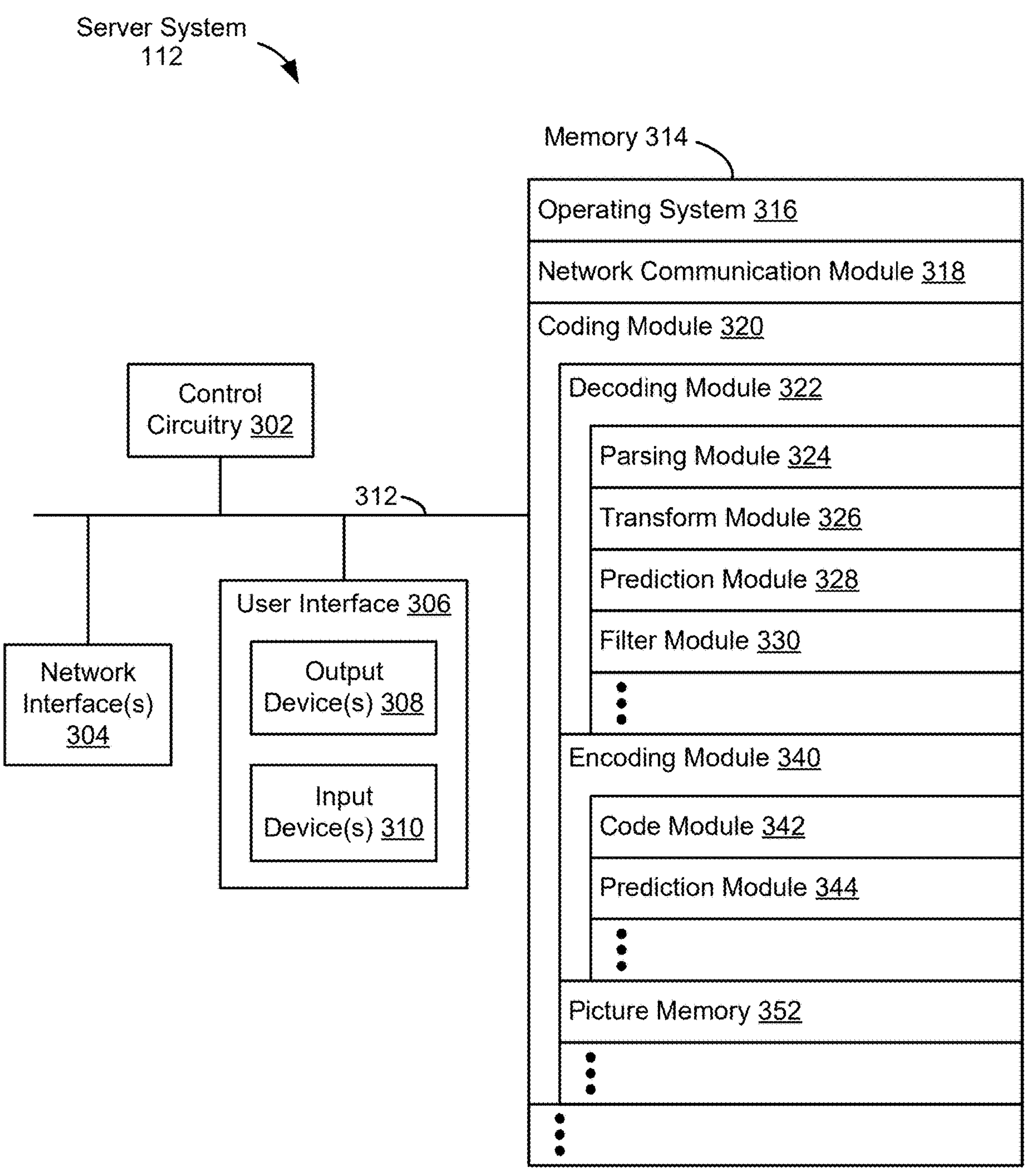
FIG. 3 is a block diagram illustrating an example server system in accordance with some embodiments.

FIG. 3 is a block diagram illustrating the server system 112 in accordance with some embodiments. The server system 112 includes control circuitry 302, one or more network interfaces 304, a memory 314, a user interface 306, and one or more communication buses 312 for interconnecting these components. In some embodiments, the control circuitry 302 includes one or more processors (e.g., a CPU, GPU, and/or DPU). In some embodiments, the control circuitry includes field-programmable gate array(s), hardware accelerators, and/or integrated circuit(s) (e.g., an application-specific integrated circuit).

The network interface(s) 304 may be configured to interface with one or more communication networks (e.g., wireless, wireline, and/or optical networks). The communication networks can be local, wide-area, metropolitan, vehicular and industrial, real-time, delay-tolerant, and so on. Examples of communication networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Such communication can be unidirectional, receive only (e.g., broadcast TV), unidirectional send-only (e.g., CANbus to certain CANbus devices), or bi-directional (e.g., to other computer systems using local or wide area digital networks). Such communication can include communication to one or more cloud computing networks.

The user interface 306 includes one or more output devices 308 and/or one or more input devices 310. The input device(s) 310 may include one or more of: a keyboard, a mouse, a trackpad, a touch screen, a data-glove, a joystick, a microphone, a scanner, a camera, or the like. The output device(s) 308 may include one or more of: an audio output device (e.g., a speaker), a visual output device (e.g., a display or monitor), or the like.

The memory 314 may include high-speed random-access memory (such as DRAM, SRAM, DDR RAM, and/or other random access solid-state memory devices) and/or non-volatile memory (such as one or more magnetic disk storage devices, optical disk storage devices, flash memory devices, and/or other non-volatile solid-state storage devices). The memory 314 optionally includes one or more storage devices remotely located from the control circuitry 302. The memory 314, or, alternatively, the non-volatile solid-state memory device(s) within the memory 314, includes a non-transitory computer-readable storage medium. In some embodiments, the memory 314, or the non-transitory computer-readable storage medium of the memory 314, stores the following programs, modules, instructions, and data structures, or a subset or superset thereof:

- an operating system 316 that includes procedures for handling various basic system services and for performing hardware-dependent tasks;
- a network communication module 318 that is used for connecting the server system 112 to other computing devices via the one or more network interfaces 304 (e.g., via wired and/or wireless connections);
- a coding module 320 for performing various functions with respect to encoding and/or decoding data, such as video data. In some embodiments, the coding module 320 is an instance of the coder component 114. The coding module 320 including, but not limited to, one or more of:
  - a decoding module 322 for performing various functions with respect to decoding encoded data, such as those described previously with respect to the decoder component 122; and
  - an encoding module 340 for performing various functions with respect to encoding data, such as those described previously with respect to the encoder component 106; and
- a picture memory 352 for storing pictures and picture data, e.g., for use with the coding module 320. In some embodiments, the picture memory 352 includes one or more of: the reference picture memory 208, the buffer memory 252, the current picture memory 264, and the reference picture memory 266.

In some embodiments, the decoding module 322 includes a parsing module 324 (e.g., configured to perform the various functions described previously with respect to the parser 254), a transform module 326 (e.g., configured to perform the various functions described previously with respect to the scalar/inverse transform unit 258), a prediction module 328 (e.g., configured to perform the various functions described previously with respect to the motion compensation prediction unit 260 and/or the intra picture prediction unit 262), and a filter module 330 (e.g., configured to perform the various functions described previously with respect to the loop filter 256).

In some embodiments, the encoding module 340 includes a code module 342 (e.g., configured to perform the various functions described previously with respect to the source coder 202 and/or the coding engine 212) and a prediction module 344 (e.g., configured to perform the various functions described previously with respect to the predictor 206). In some embodiments, the decoding module 322 and/or the encoding module 340 include a subset of the modules shown in FIG. 3. For example, a shared prediction module is used by both the decoding module 322 and the encoding module 340.

Each of the above identified modules stored in the memory 314 corresponds to a set of instructions for performing a function described herein. The above identified modules (e.g., sets of instructions) need not be implemented as separate software programs, procedures, or modules, and thus various subsets of these modules may be combined or otherwise re-arranged in various embodiments. For example, the coding module 320 optionally does not include separate decoding and encoding modules, but rather uses a same set of modules for performing both sets of functions. In some embodiments, the memory 314 stores a subset of the modules and data structures identified above. In some embodiments, the memory 314 stores additional modules and data structures not described above.

Although FIG. 3 illustrates the server system 112 in accordance with some embodiments, FIG. 3 is intended more as a functional description of the various features that may be present in one or more server systems rather than a structural schematic of the embodiments described herein. In practice, items shown separately could be combined and some items could be separated. For example, some items shown separately in FIG. 3 could be implemented on single servers and single items could be implemented by one or more servers. The actual number of servers used to implement the server system 112, and how features are allocated among them, will vary from one implementation to another and, optionally, depends in part on the amount of data traffic that the server system handles during peak usage periods as well as during average usage periods.

Example Coding Techniques

The coding processes and techniques described below may be performed at the devices and systems described above (e.g., the source device 102, the server system 112, and/or the electronic device 120). According to some embodiments, methods for inter prediction with vector refinement are described.

For example, decoder-side motion vector refinement refines motion vectors using existing decoder-side information, e.g., the reconstructed samples. As an example, an optical flow equation may be applied to formulate a least squares problem, from which fine motions can be derived from gradients of compound inter prediction samples. With those fine motions, the motion vector (MV) per subblock may be refined within a prediction block, and thus enhance inter prediction quality. This may be an extension of BDOF as it supports MV refinement when the two reference blocks have arbitrary temporal distances to the current block. The gradient of the current whole block predictors may be pre-computed and the subblock refined MVs may then be computed depending on the optical flow model.

In the following, "prefetched samples" may refer to a restricted maximum number of samples (from the reference pictures) that can be used in the bilateral matching process and "prefetching area" may refer to the area occupied by the prefetched samples. The higher number of prefetched samples requires higher memory bandwidth when performing the bilateral matching process.

As discussed above, some codecs (e.g., AV1 and VVC) operate on pixel blocks. Each pixel block may be processed in a predictive-transform coding scheme, where a prediction is obtained using reference pixels and/or motion compensation. For inter-predicted blocks, motion parameters such as motion vectors, reference picture indices, reference picture list usage index, and/or additional information needed may be used for inter-predicted sample generation. The motion parameters can be signaled in an explicit or implicit manner. As discussed above, inter-predicted blocks can use temporal motion vectors and/or spatial motion vectors. Additionally, a subblock level motion vector refinement may be applied to extend a block-level TMVP.

Figure 4A:
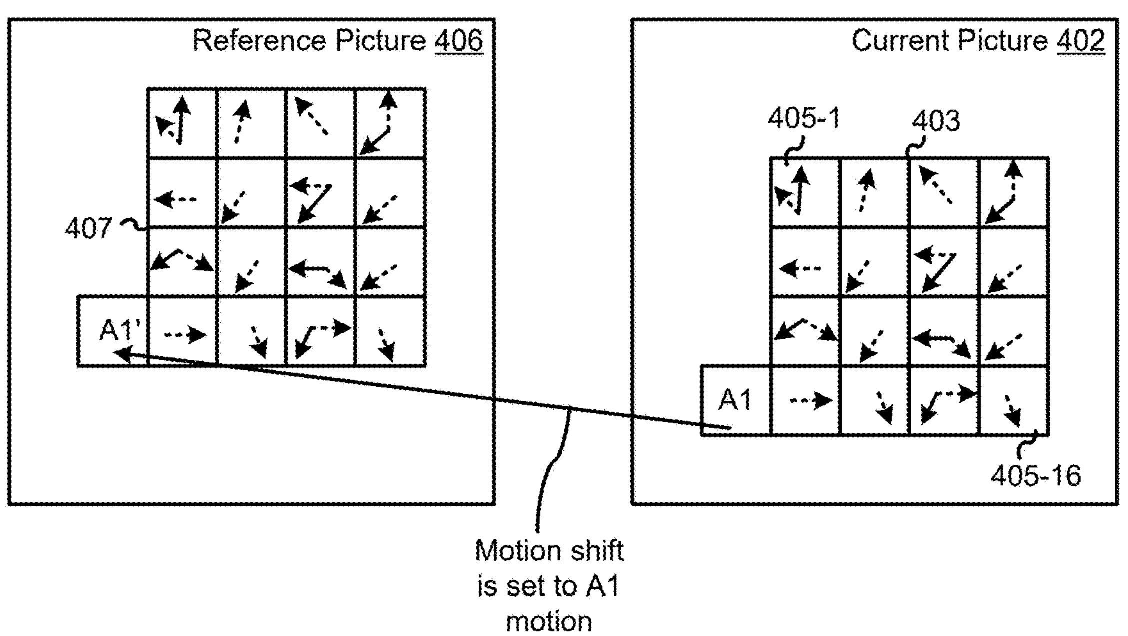
FIG. 4A illustrates an example of deriving subblock motion vectors in accordance with some embodiments.

FIG. 4A illustrates an example of deriving subblock motion vectors in accordance with some embodiments. In FIG. 4A, a current picture 402 includes a current block 403 that is composed of subblocks 405-1 through 405-15. The number and sizing of subblocks and blocks in FIG. 4A is merely an example and in other embodiments, different numbers and sizes of blocks and subblocks are used. FIG. 4A further shows a reference picture 406 with a reference block 407 corresponding to the current block 403. In the example of FIG. 4A, the reference block 407 is identified using a motion shift derived from the motion in block A1. The arrows in the subblocks in FIG. 4A illustrate motion vectors, with the dashed line arrows corresponding to motion from an L0 reference picture and the solid line arrows corresponding to motion from an L1 reference picture.

Thus, FIG. 4A illustrates an example of subblock-based TMVP (SbTMVP). SbTMVP may predict the motion vectors of the subblocks within the current block in two steps. In a first step, the spatial neighbor, denoted A1 in FIG. 4A, is identified. If A1 has a motion vector that uses the collocated picture as its reference picture, this motion vector is selected to be the motion shift (or displacement vector) to be applied. If no such motion is identified, then the motion shift may be set to (0, 0). The example in FIG. 4A uses a motion shift based on the motion vector from block A1.

In the second step, the motion shift identified in the first step is applied (e.g., added to the current block's coordinates) to obtain subblock-level motion information (motion vectors and reference indices) from the collocated picture as shown in FIG. 4A. Then, for each subblock, the motion information of its corresponding block (e.g., the smallest motion grid that covers the center sample) in the collocated picture is used to derive the motion information for the subblock. After the motion information of the collocated subblock is identified, it is converted to motion vectors and reference indices of the current subblock in a similar way as the TMVP process, where temporal motion scaling is applied to align the reference pictures of the temporal motion vectors to those of the current block.

As described above, SbTMVP allows inheriting the motion information at a subblock-level from a collocated reference picture. For example, each subblock of a large size coding block (e.g., a CU) can have its own motion information without explicitly transmitting a block partition structure or motion information. SbTMVP may obtain motion information for each subblock in three steps. The first step is the derivation of displacement vector (DV) of the current coding block. In step two, the availability of the SbTMVP candidate is accessed and central motion is derived. In step three, the subblock motion information is derived from the corresponding subblock by the DV. Thus, unlike TMVP candidate derivation which always derives the temporal motion vectors from the collocated block in the reference frame, SbTMVP may apply a DV which is derived from the MV of the left neighboring coding block of the current coding block to find the corresponding subblock in the collocated picture for each subblock of the current CU. In case the corresponding subblock is not inter-coded, the motion information of the current subblock may be set to be the central motion.

In this way, SbTMVP uses a motion field in a collocated picture to improve motion vector prediction and merge mode for coding blocks in the current picture. The same collocated picture used by TMVP may be used for SbTMVP. SbTMVP differs from TMVP in that TMVP predicts motion at a coding block level whereas SbTMVP predicts motion at sub-coding block level. Additionally, TMVP fetches temporal motion vectors from a collocated block in the collocated picture (e.g., the collocated block is the bottom-right or center block relative to the current CU), whereas SbTMVP applies a motion shift before fetching the temporal motion information from the collocated picture. The motion shift may be obtained from the motion vector from one of the spatial neighboring blocks of the current coding block.

Figure 4B:
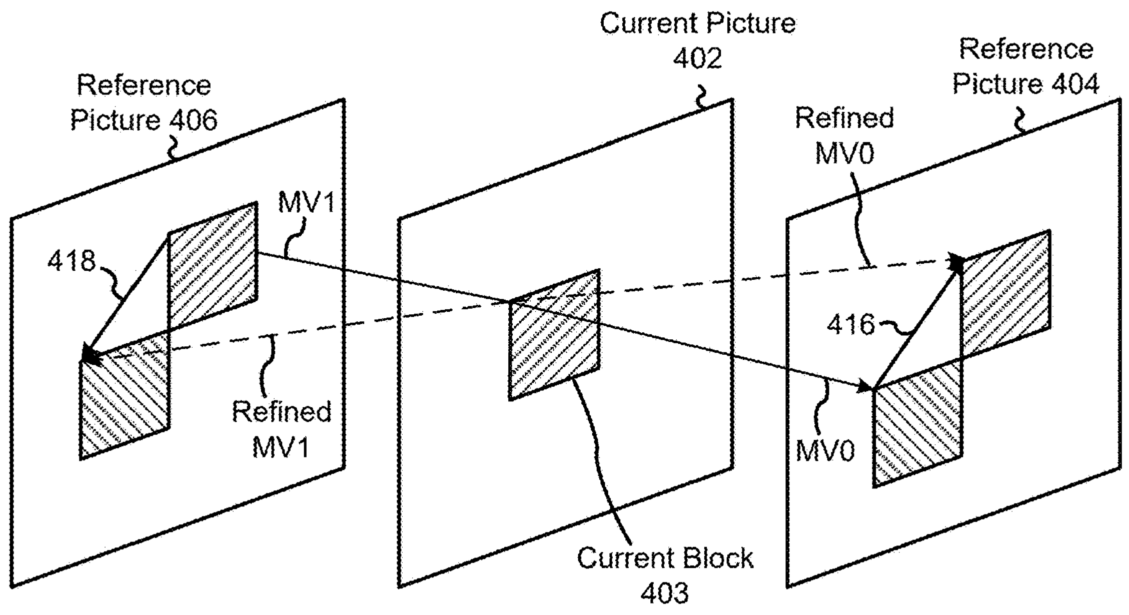
FIG. 4B illustrates an example of decoder-side motion vector refinement in accordance with some embodiments.

FIG. 4B illustrates an example of decoder-side motion vector refinement in accordance with some embodiments. In FIG. 4B, refined motion vectors (Refined MV0 and Refined MV1) are derived using a set of reference picture 404 and 406. An initial reference block may be identified in each reference picture using initial motion vectors, MV0 and MV1. A motion difference (indicated by arrows 416 and 418 in FIG. 4B) is applied to each motion vector in FIG. 4B to derive the refined motion vectors. Thus, FIG. 4B illustrates an example of decoder side motion vector refinement (DMVR) being applied to a coding block (e.g., in a merge mode). The pair of MVs obtained from a regular merge candidate may be used as input of the DMVR process. DMVR applies the bilateral matching (BM) to refine the input MV pair $\{mv_{L0}, mv_{L1}\}$ and uses the refined MV pair for the motion compensated prediction (e.g., of both luma and chroma components). The output MV of DMVR, a refined MV pair, is defined in Equation Set 1:

Refined Motion Vector Pair $$mv_{refinedL0} = mv_{L0} + \Delta mv \qquad \text{Equation Set 1}$$

$$mv_{refinedL1} = mv_{L1} - \Delta mv$$

In Equation Set 1, a motion vector difference, Δmv, is applied to the input MV pair to obtain the refined MV pair by using an MVD mirroring property (e.g., because the input MV pair point to two different reference pictures that have equal difference in picture order count (POC) to the current picture and these two reference pictures are at different temporal direction).

In an example DMVR process, a luma coded block is divided into 16×16 subblocks for the MV refinement process. The Δmv is derived independently for each subblocks in the following two steps, an integer precision motion search followed by a fractional motion search. Finally, the subblock motion compensation (MC) is applied using the refined MV pair $\{mv_{refinedL0}, mv_{refinedL1}\}$.

An integer sample offset search may be performed in DMVR. In an example implementation, a search space includes MV pair candidates (e.g., 25 pair candidates) as shown in Equation Set 2:

Search Space for MV Pair Candidates $$mv_{L0(i,j)} = mv_{L0(0,0)} + (i, j) \qquad \text{Equation Set 2}$$

$$mv_{L1(i,j)} = mv_{L1(0,0)} - (i, j)$$

where (i, j) represents the coordinate of the search point around the initial MV pair, and i and j are integer value between −2 and 2 inclusive. The sum of absolute difference (SAD) for the initial MV pair is calculated as shown in Equation Set 3 below:

SAD Calculation $$SAD(i, j) = K\sum_{n=0}^{\frac{H}{2}}\sum_{m=0}^{W} diff_{m,n} \qquad \text{Equation Set 3}$$

$$diff_{m,n} = \text{abs}(P0_{i,j}[m+i, 2n+j] - P1_{i,j}[m-i, 2n-j])$$

$$K = \begin{cases} 3/4 & i = 0, j = 0 \\ 1 & \text{otherwise} \end{cases}$$

where W and H are the weight and height of the subblock. If the SAD of the initial MV pair is smaller than a threshold, the integer sample stage of DMVR is terminated. Otherwise SADs of the remaining 24 points are calculated and checked in raster scanning order. The point with the smallest SAD is selected as the output of integer sample offset searching stage. In some embodiments, e.g., to reduce the penalty of the uncertainty of DMVR refinement, the SAD between the reference blocks referred by the initial MV candidates is decreased by ¼ of the SAD value.

In some embodiments, the candidate MV pair selected in the integer sample offset search step is further refined. For example, the fractional sample refinement may be derived by using parametric error surface equation (e.g., to save the calculational complexity), instead of additional search with SAD comparison. The fractional sample refinement is conditionally invoked based on the output of the integer sample search stage. For example, the fractional sample refinement is conditionally invoked based on the output of the integer sample search stage. As an example, when the integer sample search stage is terminated with center having the smallest SAD in either the first iteration or the second iteration search, the fractional sample refinement is further applied.

An optical flow refinement (e.g., BDOF) may be used to refine the bi-prediction signal of a coding block (e.g., a CU). For example, BDOF may be performed at a 4×4 subblock level. BDOF may be applied to a coding block if it satisfies at least a subset of the following conditions: (i) the coding block is coded using a bi-prediction mode in which one of the two reference pictures is prior to the current picture in display order and the other is after the current picture in display order, (ii) the distances (e.g., the POC difference) from two reference pictures to the current picture are same, (iii) both of the reference pictures are short-term reference pictures, (iv) the coding block is not coded using an affine mode or an SbTVMP merge mode, (v) coding unit has more than 64 luma samples, (vi) the coding unit height and width are larger than or equal to 8 luma samples, (vii) BCW weight index indicates equal weight, (viii) WP is not enabled for the current coding block, and (ix) CIIP mode is not used for the current coding block. In some implementations, BDOF is only applied to a luma component.

The BDOF mode is based on an optical flow concept, which assumes that the motion of an object is smooth. For each subblock (e.g., 4×4 subblock), a motion refinement ($v_x$, $v_y$) may be calculated by minimizing the difference between the L0 and L1 prediction samples. The motion refinement can then be used to adjust the bi-predicted sample values in the subblock, as discussed in detail below.

The horizontal and vertical gradients, $$\frac{\partial I^{(k)}}{\partial x}(i, j) \text{ and } \frac{\partial I^{(k)}}{\partial y}(i, j),$$

k=0,1, of the two prediction signals can be computed by directly calculating the difference between two neighboring samples as shown below in Equation Set 4:

Gradient Calculations

Equation Set 4

$$\frac{\partial I^{(k)}}{\partial x}(i, j) = \left(\left(I^{(k)}(i+1, j) \gg \text{shift1}\right) - \left(I^{(k)}(i-1, j) \gg \text{shift1}\right)\right)$$

$$\frac{\partial I^{(k)}}{\partial y}(i, j) = \left(\left(I^{(k)}(i, j+1) \gg \text{shift1}\right) - \left(I^{(k)}(i, j-1) \gg \text{shift1}\right)\right)$$

where $I^{(k)}(i, j)$ are the sample value at coordinate (i, j) of the prediction signal in list k, k=0,1, and shift1 is calculated based on the luma bit depth, bitDepth, as shift1=max (6, bitDepth-6). Then, the auto-and cross-correlation of the gradients, $S_1$, $S_2$, $S_3$, $S_5$ and $S_6$, are calculated as shown in Equation Set 5:

Auto- and Cross-correlation Calculations

Equation Set 5

$$S_1 = \sum_{(i,j)\in\Omega} \text{Abs}(\psi_x(i, j)),\ S_3 = \sum_{(i,j)\in\Omega} \theta(i, j)\cdot\text{Sign}(\psi_x(i, j))$$

$$S_2 = \sum_{(i,j)\in\Omega} \psi_x(i, j)\cdot\text{Sign}(\psi_y(i, j))$$

$$S_5 = \sum\nolimits_{(i,j)\in\Omega} \text{Abs}(\psi_y(i, j)),\ S_6 = \sum\nolimits_{(i,j)\in\Omega} \theta(i, j)\cdot\text{Sign}(\psi_y(i, j))$$

where ψ and θ are defined by Equation Set 6:

Equation Set 6

$$\psi_x(i, j) = \left(\frac{\partial I^{(1)}}{\partial x}(i, j) + \frac{\partial I^{(0)}}{\partial x}(i, j)\right) \gg n_a$$

$$\psi_y(i, j) = \left(\frac{\partial I^{(1)}}{\partial y}(i, j) + \frac{\partial I^{(0)}}{\partial y}(i, j)\right) \gg n_a$$

$$\theta(i, j) = \left(I^{(1)}(i, j) \gg n_b\right) - \left(I^{(0)}(i, j) \gg n_b\right)$$

where Ω is a 6×6 window around the subblock, and the values of $n_a$ and $n_b$ are set equal to min(1, bitDepth-11) and min(4, bitDepth-8), respectively.

The motion refinement ($v_x$, $v_y$) can then be derived using the cross- and auto-correlation terms using Equation Set 7:

Motion Refinement Calculation

Equation Set 7

$$v_x = S_1 > 0?\text{clip3}(-th'_{BIO}, th'_{BIO}, -((S_3\cdot 2^{n_b-n_a}) \gg \lfloor\log_2 S_1\rfloor)):0$$

$$v_y = S_5 > 0?\text{clip3}\left(-th'_{BIO}, th'_{BIO}, -\left(\left(S_6\cdot 2^{n_b-n_a} - \left((v_x S_{2,m}) \ll n_{S_2} + v_x S_{2,s}\right)/2\right) \gg \lfloor\log_2 S_5\rfloor\right)\right):0$$

where $S_{2,m}=S_2>>n_{S_2}$, $S_{2,s}=S_2\&(2^{n_{S2}}-1)$, $th'_{BIO}=2^{max(5,BD-7)}$. ⌊·⌋ is the floor function, and $n_{S_2}=12$.

Based on the motion refinement and the gradients, an adjustment can be calculated for each sample in the sun-block using Equation Set 8:

Motion Refinement Adjustment Calculation

Equation Set 8

$$b(x, y) = rnd\left(\left(v_x\left(\frac{\partial I^{(1)}(x, y)}{\partial x} - \frac{\partial I^{(0)}(x, y)}{\partial x}\right) + v_y\left(\frac{\partial I^{(1)}(x, y)}{\partial y} - \frac{\partial I^{(0)}(x, y)}{\partial y}\right) + 1\right)/2\right)$$

The BDOF samples of the coding block can then be calculated by adjusting the bi-prediction samples as follows:

BDOF Calculation

Equation 9

$$pred_{BDOF}(x, y) = \left(I^{(0)}(x, y) + I^{(1)}(x, y) + b(x, y) + o_{offset}\right) \gg \text{shift}$$

These values may be selected such that the multipliers in the BDOF process do not exceed 15-bit, and the maximum bit-width of the intermediate parameters in the BDOF process is kept within 32-bit.

To derive the gradient values, some prediction samples $I^{(k)}(i, j)$ in list k (k=0,1) outside of the current coding block boundaries may be identified and used. For example, BDOF may use one extended row/column around the coding block boundaries. For example, prediction samples in the extended area may be generated by taking the reference samples at the nearby integer positions (e.g., using a floor() operation on the coordinates) directly without interpolation (e.g., to control the computational complexity of generating the out-of-boundary prediction samples), and the normal 8-tap motion compensation interpolation filter is used to generate prediction samples within the coding block. These extended sample values may be used in the gradient calculation. For the other steps in the BDOF process, if any sample and gradient values outside of the coding block boundaries are needed, they may be padded (e.g., copied) from their nearest neighbors.

In some implementations, a multi-pass decoder-side motion vector refinement is applied. For example, in the first pass, bilateral matching (BM) is applied to the coding block, in the second pass, BM is applied to each 16×16 subblock within the coding block, and, in the third pass, the MV in each 8×8 subblock is refined by applying bi-directional optical flow (BDOF). The refined MVs may then be stored for subsequent spatial and/or temporal motion vector predictions.

As discussed above, decoder-side motion vector refinement refines motion vectors using the existing decoder-side information, e.g., the reconstructed samples. Additionally, an optical flow equation may be applied to formulate a least squares problem, from which fine motions can be derived from gradients of compound inter prediction samples. With those fine motions, the MV may be refined per subblock within a prediction block, thereby enhancing inter prediction quality. This implementation is an extension of BDOF as it supports MV refinement when the two reference blocks have arbitrary temporal distances to the current block. The gradient of the current whole block predictors may be pre-computed and the subblock refined MVs may then be computed depending on the optical flow model.

Bilateral matching may be used for the MV refinement. In bilateral matching-based decoder side motion vector refinement, two candidate predictor blocks may be directly compared using distortion metrics such as the sum of absolute difference (SAD). The candidate blocks with lowest distortion may then be used as the refined block. Decoder side motion vector refinement can be performed at block level or subblock level. In the subblock level, the current block is divided into multiple subblocks, and each subblock bilateral matching is performed independently. The subblock based decoder-side motion vector refinement can achieve motion vector refinement at finer granularity, e.g., the subblock level, but the matching cost may be also less accurate as less samples are used to conclude the matching cost.

Building on the features and techniques described above, an optical flow-based motion vector refinement is described below. For example, when computing the subblock refined MVs of the optical flow refinement, the subblock sizes may be adaptively selected. In this example, the final motion compensation is not affected (e.g., a fixed subblock size is used).

Figures 4C, 4D:
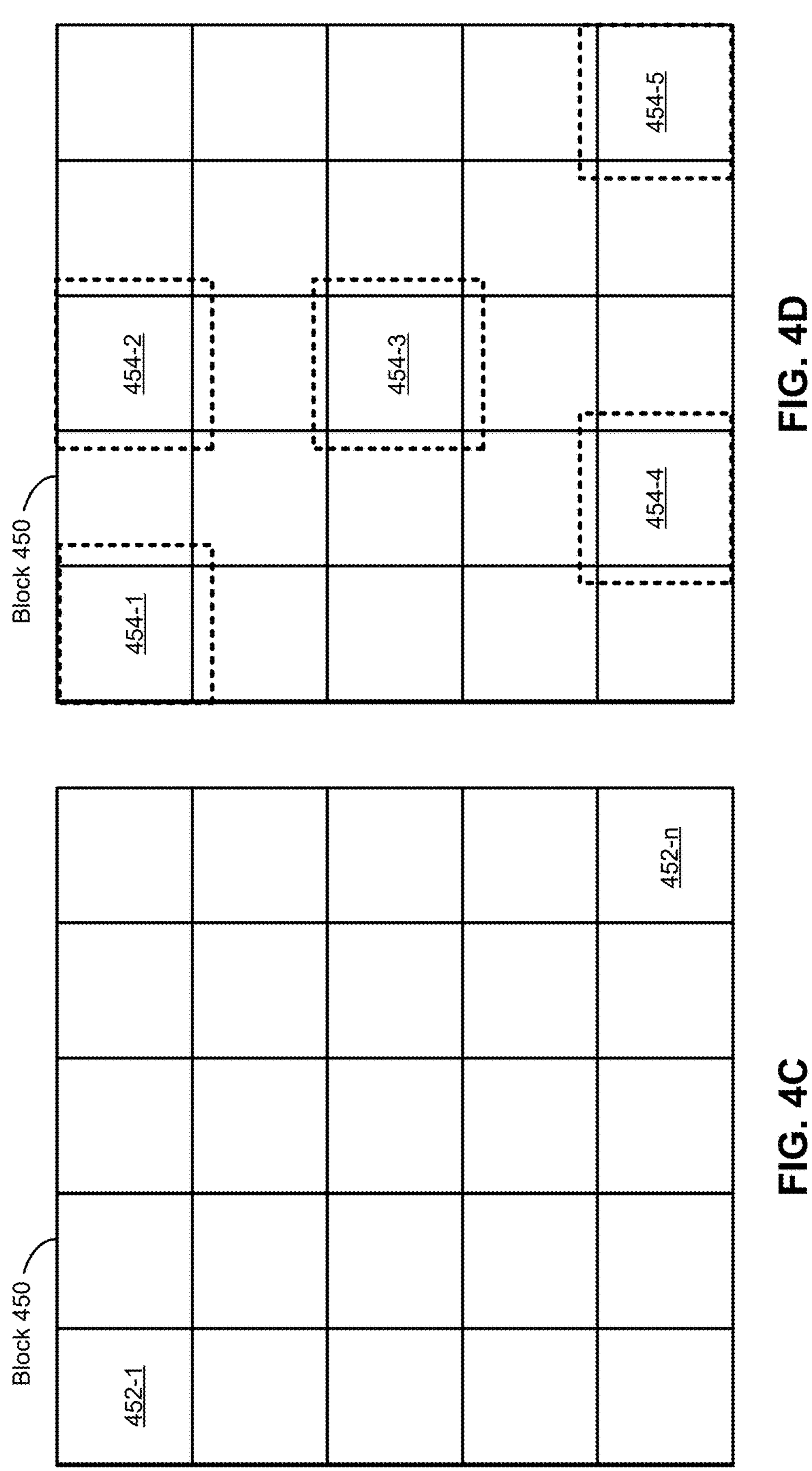
FIG. 4C illustrates an example block partitioned into a set of subblocks in accordance with some embodiments.
FIG. 4D illustrates example subblocks having adaptive sizes in accordance with some embodiments.

FIG. 4C illustrates a block 450 partitioned into a set of subblocks 452 (e.g., 452-1 through 452-*n*) in accordance with some embodiments. In the example of FIG. 4C the set of subblocks 452 have uniform size (e.g., squares). In some embodiments, the set of subblocks may have varying sizes, shapes, and/or aspect ratios. FIG. 4D illustrates subblocks 454 (e.g., 454-1 through 454-5) having adaptive sizes in accordance with some embodiments. In some embodiments, the subblocks 454 (with varying sizes) are used for an optical flow refinement and the subblocks 452 are used for a final motion compensation.

Figures 5A, 5B:
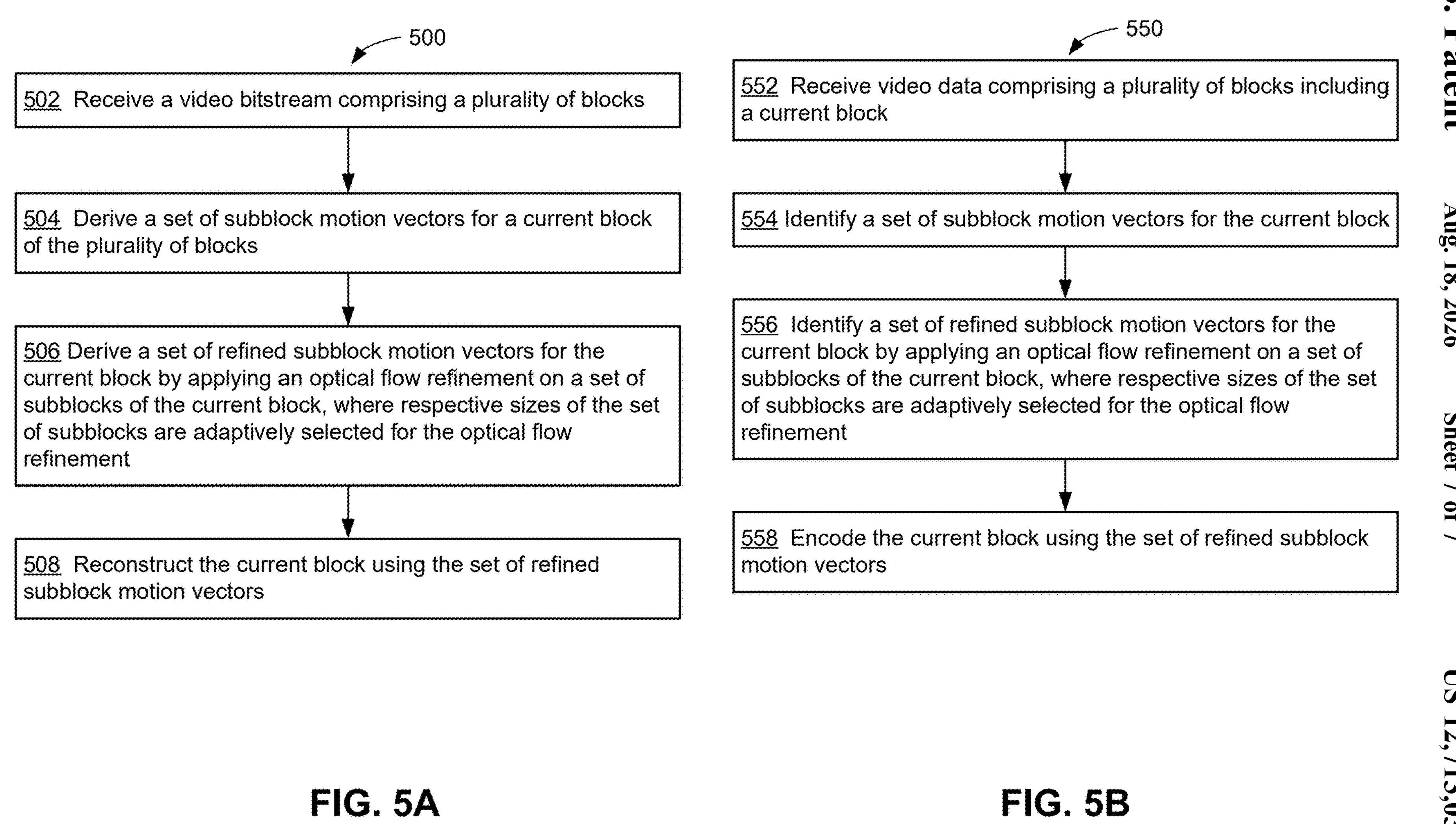
FIG. 5A illustrates an example video decoding process in accordance with some embodiments.
FIG. 5B illustrates an example video encoding process in accordance with some embodiments.

FIG. 5A is a flow diagram illustrating a method 500 of decoding video in accordance with some embodiments. The method 500 may be performed at a computing system (e.g., the server system 112, the source device 102, or the electronic device 120) having control circuitry and memory storing instructions for execution by the control circuitry. In some embodiments, the method 500 is performed by executing instructions stored in the memory (e.g., the memory 314) of the computing system.

The system receives (502) a video bitstream (e.g., a coded video sequence) comprising a plurality of blocks corresponding to one or more pictures. The system derives (504) a set of subblock motion vectors for a current block of the plurality of blocks (e.g., using a TMVP technique). The system derives (506) a set of refined subblock motion vectors for the current block by applying an optical flow refinement on a set of subblocks of the current block, where respective sizes (e.g., as illustrated in FIG. 4D) of the set of subblocks are adaptively selected for the optical flow refinement. The system reconstructs (508) the current block using the set of refined subblock motion vectors. In some embodiments, when computing the subblock refined MVs of the optical flow refinement, the subblock sizes are adaptively selected. In some embodiments, the final motion compensation is not affected, e.g., a fixed subblock size is used.

In some embodiments, one or more base subblock sizes are predefined, derived, or signaled. For example, the subblock size is defined as 8×8 under one coding mode (or a certain condition). If the subblock is not located at the boundary of the whole block, this subblock is further extended N samples each side to derive the optical flow based refined MV, e.g., initial interpolated samples, gradients, and corresponding operations are extended by N samples each side (above, below, left, and right). In one example, the N equals to 2. In this example, 12×12 interpolated samples and gradients are used to compute the optical flow based MV refinement for an 8×8 subblock in the condition of that this subblock is not located at the boundary of the whole block. In this example, the final MC is performed at the 8×8 subblock.

In some embodiments, if a subblock is located at the boundary (or corner) of the current whole block, the subblock is still extended as described above and the missing samples/gradient values are padded. In some embodiments, if a subblock is located at the boundary (or corner) of the current whole block, the subblock is extended with N1 samples on each side (e.g., with N1 being different than N) and the missing samples/gradient values are padded. In some embodiments, N1 is a different number from N. As an example, N is set to 2 and N1 is set to 1. In some embodiments, if a subblock is located at the boundary (or corner) of the current whole block, the subblock is not extended, and the refinement is computed using the base (or predefined) subblock size, e.g., 8×8, whereas another subblock in the current whole block that is not located at the boundary (or corner) is extended as described above.

In some embodiments, if a subblock is located at the corner of the current whole block (i.e., two edges of the subblock are adjacent to the current whole block), the extension of N samples is performed on the other two sides inside the current whole block. For example, the current subblock is 8×8, and current whole block is 32×32. If the current subblock is located at the top left corner of the current whole block (e.g., the top and left edges of the current subblock are adjacent to the current whole block), only bottom side and right side of the current whole block are extended (e.g., extended 2 samples) for the optical flow based MV refinement derivation, which means the extended subblock size is 10×10.

In some embodiments, if the subblock is located at the boundary (but not corner) of the current whole block (i.e., one edge of the subblock is adjacent to the current whole block), the extension of N samples is performed on the three sides inside the current whole blocks. For example, the current subblock is 8×8, and current whole block is 32×32. If the current subblock is located at the top boundary of the current whole block (e.g., only the top edge of the current subblock is adjacent to the current whole block), the bottom side, left side, and right side of the current whole block are extended 2 samples for the optical flow based MV refinement derivation, which means the extended subblock size is 12×10.

In some embodiments, the number of extended samples (N) depends on the relative subblock position within the coding block. For example, for a subblock that is closer to the coding block boundary, a smaller number of extended samples may be applied and for a subblock that is further to the coding block boundary, a larger number of extended samples may be applied.

FIG. 5B is a flow diagram illustrating a method 550 of encoding video in accordance with some embodiments. The method 550 may be performed at a computing system (e.g., the server system 112, the source device 102, or the electronic device 120) having control circuitry and memory storing instructions for execution by the control circuitry. In some embodiments, the method 550 is performed by executing instructions stored in the memory (e.g., the memory 314) of the computing system. In some embodiments, the method 550 is performed by a same system as the method 500 described above.

The system receives (552) video data (e.g., a source video sequence) comprising a set of blocks, including a current block, that correspond to one or more pictures. The system identifies (554) a set of subblock motion vectors for the current block. The system identifies (556) a set of refined subblock motion vectors for the current block by applying an optical flow refinement on a set of subblocks of the current block, where respective sizes of the set of subblocks are adaptively selected for the optical flow refinement. The system encodes (558) the current block using the set of refined subblock motion vectors. As described previously, the encoding process may mirror the decoding processes described herein (e.g., determining motion vectors). For brevity, those details are not repeated here.

Although FIGS. 5A and 5B illustrate a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

Turning now to some example embodiments.

(A1) In one aspect, some embodiments include a method (e.g., the method 500) of video decoding. In some embodiments, the method is performed at a computing system (e.g., the server system 112) having memory and one or more processors. In some embodiments, the method is performed at a coding module (e.g., the coding module 320). The method includes: (i) receiving a video bitstream (e.g., a coded video sequence) comprising a plurality of blocks (e.g., corresponding to one or more pictures); (ii) deriving a set of subblock motion vectors for a current block of the plurality of blocks (e.g., using a TMVP process); (iii) deriving a set of refined subblock motion vectors for the current block by applying an optical flow refinement on a set of subblocks of the current block, where respective sizes of the set of subblocks are adaptively selected for the optical flow refinement; and (iv) reconstructing the current block using the set of refined subblock motion vectors. For example, when computing the subblock refined MVs of an optical flow refinement, the subblock sizes are adaptively selected. In this example, the final motion compensation is not be affected, i.e., a fixed subblock size is used.

(A2) In some embodiments of A1, the respective sizes of the set of subblocks are predefined. For example, one or multiple base subblock sizes are predefined, derived, or signaled.

(A3) In some embodiments of A1, the respective sizes of the set of subblocks are derived or signaled. For example, one or more base sizes are predefined and one or more adapted sizes are derived and/or signaled.

(A4) In some embodiments of any of A1-A3, the respective sizes comprise a base size and a second size, where the second size corresponds to the base size with N additional columns and rows, N being a non-negative integer. For example, the subblock size may be defined as 8×8 for a particular coding mode (and/or under a certain condition). If the subblock is not located at the boundary of the whole block, this subblock is further extended N samples on each side to derive the optical flow based refined MV (e.g., initial interpolated samples, gradients, and corresponding operations are extended by N samples each side (above, below, left and right)).

(A5) In some embodiments of A4, a value for N is based on a position of a subblock within the current block. For example, the number of extended samples depends on the relative subblock position within the coding block. In one example, for a subblock that is closer to the coding block boundary, a smaller number of extended samples may be applied and for a subblock that is further to the coding block boundary, a bigger number of extended samples may be applied.

(A6) In some embodiments of A4 or A5, a value for N is selected from the group consisting of 1, 2, 3, and 4. For example, the base size may be 8×8 and N may be equal to 2. In this example, 12×12 interpolated samples and corresponding gradients are used to compute the optical flow based MV refinement for the 8×8 subblock (e.g., in the condition of that this subblock is not located at the boundary of the whole block. The final MC will be performed at the 8×8 subblock.

(A7) In some embodiments of any of A1-A6, the method further includes padding one or more values for an extended size of a subblock located at a boundary of the current block. For example, when the subblock is located at a top boundary of the current block, the top samples of the subblock are padded to obtain an extended subblock. As another example, when the subblock is located at a corner of the current block, padding is applied to the two sides of the subblock that are at the boundaries of the current block.

(A8) In some embodiments of any of A1-A7, the method further includes extending a first subblock of the set of subblocks according to a first size of the respective sizes, including: (i) when the first subblock is located at a boundary of the current block, extending one or more first sides of the first subblock by N samples and padding one or more second sides of the first subblock; and (ii) when the first subblock is not located at the boundary of the current block, extending each side of the first subblock by N samples. For example, if a subblock is located at the boundary (or corner) of the current whole block, the subblock may be extended (e.g., in a same manner as interior subblocks) and the missing samples and/or gradient values are padded. For example, the first sides are on an interior of the current block and the second sides are on an exterior of the current block.

(A9) In some embodiments of any of A1-A7, the method further includes extending a first subblock of the set of subblocks according to a first size of the respective sizes, including: (i) when the first subblock is located at a boundary of the current block, extending one or more first sides of the first subblock by M samples and padding one or more second sides of the first subblock; and (ii) when the first subblock is not located at the boundary of the current block, extending each side of the first subblock by N samples, wherein N is different than M. For example, if a subblock is located at the boundary (or corner) of the current whole block, the subblock may be extended by M samples on each side and the missing samples and/or gradient values are padded. In this example, M is a different number from N. For example, N may be set to 2 and M may be set to 1.

(A10) In some embodiments of any of A1-A6, the method further includes extending a first subblock of the set of subblocks according to a first size of the respective sizes, including: (i) when the first subblock is located at a boundary of the current block, not extending the first subblock; and (ii) when the first subblock is not located at the boundary of the current block, extending each side of the first subblock by N samples. For example, if a subblock is located at the boundary (or corner) of the current whole block, the subblock is not extended and is computed using the predefine subblock size, e.g., 8×8, whereas other subblocks in the current whole block that are not located at the boundary (or corner) are extended to larger sizes.

(A11) In some embodiments of any of A1-A6, the method further includes extending a first subblock of the set of subblocks according to a first size of the respective sizes, including: (i) when the first subblock is located at a boundary of the current block, extending sides of the first subblock that are on an interior of the current block and not extending sides of the first block that are on the boundary of the current block; and (ii) when the first subblock is not located at the boundary of the current block, extending each side of the first subblock by N samples. For example, if a subblock is located at the corner of the current whole block (i.e., two edges of the subblock are adjacent to the current whole block), an extension of N samples is performed on the other two sides inside the current whole block. In one example, the current subblock is 8×8 and current whole block is 32×32. The current subblock is located at the top left corner of the current whole block, i.e., top, and left edges of the current subblock are adjacent to the current whole block. In this case, only bottom side and right side of the current whole block are extended (e.g., by 2 samples) for the optical flow based MV refinement derivation, which means the extended subblock size is 10×10.

As another example, if the subblock is located at the boundary (but not corner) of the current whole block (i.e., one edge of the subblock is adjacent to the current whole block), an extension of N samples is performed on the three sides inside the current whole block. In one example, the current subblock is 8×8 and current whole block is 32×32. The current subblock is located at the top boundary of the current whole block, i.e., only the top edge of the current subblock is adjacent to the current whole block. In this case, the, bottom side, left side, and right side of the current whole block are extended (e.g., by 2 samples) for the optical flow based MV refinement derivation, which means the extended subblock size is 12×10.

(B1) In another aspect, some embodiments include a method (e.g., the method 650) of video encoding. In some embodiments, the method is performed at a computing system (e.g., the server system 112) having memory and control circuitry. In some embodiments, the method is performed at a coding module (e.g., the coding module 320). The method includes: (i) receiving video data (e.g., a source video sequence) comprising a set of blocks including a current block (e.g., corresponding to one or more pictures; (ii) identifying a set of subblock motion vectors for the current block; (iii) identifying a set of refined subblock motion vectors for the current block by applying an optical flow refinement on a set of subblocks of the current block, where respective sizes of the set of subblocks are adaptively selected for the optical flow refinement; and (iv) encoding the current block using the set of refined subblock motion vectors.

(C1) In another aspect, some embodiments include a method of visual media data processing. In some embodiments, the method is performed at a computing system (e.g., the server system 112) having memory and control circuitry. In some embodiments, the method is performed at a coding module (e.g., the coding module 320). The method includes: (i) obtaining a source video sequence that comprises a plurality of frames; and (ii) performing a conversion between the source video sequence and a video bitstream of visual media data according to a format rule. The video bitstream comprises a set of encoded blocks. The format rule specifies that: (a) a set of subblock motion vectors are to be derived for a current block of the set of encoded blocks, and (b) a set of refined subblock motion vectors are to be derived for the current block by applying an optical flow refinement on a set of subblocks of the current block, wherein respective sizes of the set of subblocks are adaptively selected for the optical flow refinement.

(C2) In some embodiments of C1, the respective sizes of the set of subblocks are predefined.

(C3) In some embodiments of C1, the respective sizes of the set of subblocks are derived or signaled.

(C4) In some embodiments of any of C1-C3, the respective sizes comprise a base size and a second size, wherein the second size corresponds to the base size with N additional columns and rows, N being a non-negative integer.

In another aspect, some embodiments include a computing system (e.g., the server system 112) including control circuitry (e.g., the control circuitry 302) and memory (e.g., the memory 314) coupled to the control circuitry, the memory storing one or more sets of instructions configured to be executed by the control circuitry, the one or more sets of instructions including instructions for performing any of the methods described herein (e.g., A1-A11, B1, and C1-C4 above).

In yet another aspect, some embodiments include a non-transitory computer-readable storage medium storing one or more sets of instructions for execution by control circuitry of a computing system, the one or more sets of instructions including instructions for performing any of the methods described herein (e.g., A1-A11, B1, and C1-C4 above).

As used herein, N refers to a variable number. Unless explicitly stated, different instances of N may refer to the same number (e.g., the same integer value, such as the number 2) or different numbers.

Unless otherwise specified, any of the syntax elements described herein may be high-level syntax (HLS). As used herein, HLS is signaled at a level that is higher than a block level. For example, HLS may correspond to a sequence level, a frame level, a slice level, or a tile level. As another example, HLS elements may be signaled in a video parameter set (VPS), a sequence parameter set (SPS), a picture parameter set (PPS), an adaptation parameter set (APS), a slice header, a picture header, a tile header, and/or a CTU header.

It will be understood that, although the terms "first," "second," etc. may be used herein to describe various elements, these elements should not be limited by these terms. These terms are only used to distinguish one element from another. The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting" that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for purposes of explanation, has been described with reference to specific embodiments. However, the illustrative discussions above are not intended to be exhaustive or limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method of video decoding performed at a computing system having memory and one or more processors, the method comprising:

receiving a video bitstream comprising a plurality of blocks;

deriving a set of subblock motion vectors for a current block of the plurality of blocks;

adaptively selecting respective sizes of a set of subblocks for optical flow refinement by extending a first subblock of the set of subblocks according to a first size of the respective sizes, including:

when the first subblock is located at a boundary of the current block, extending one or more first sides of the first subblock by N samples and padding one or more second sides of the first subblock; and when the first subblock is not located at the boundary of the current block, extending each side of the first subblock by N samples;

deriving a set of refined subblock motion vectors for the current block by applying the optical flow refinement on the set of subblocks of the current block; and reconstructing the current block using the set of refined subblock motion vectors.

2. The method of claim 1, wherein the respective sizes of the set of subblocks are predefined.

3. The method of claim 1, wherein the respective sizes of the set of subblocks are derived or signaled.

4. The method of claim 1, wherein the respective sizes comprise a base size and a second size, wherein the second size corresponds to the base size with N additional columns and rows, N being a non-negative integer.

5. The method of claim 4, wherein a value for N is selected from the group consisting of: 1, 2, 3, and 4.

6. The method of claim 4, wherein a value for N is based on a position of a subblock within the current block.

7. The method of claim 1, further comprising padding one or more values for an extended size of a subblock located at a boundary of the current block.

8. The method of claim 1, wherein the respective sizes of the set of subblocks are adaptively selected for the optical flow refinement by extending the first subblock of the set of subblocks according to a second size of the respective sizes, including:

when the first subblock is located at a boundary of the current block, extending one or more first sides of the first subblock by M samples and padding one or more second sides of the first subblock; and when the first subblock is not located at the boundary of the current block, extending each side of the first subblock by N samples, wherein N is different than M.

9. The method of claim 1, wherein the respective sizes of the set of subblocks are adaptively selected for the optical flow refinement by further comprising extending the first subblock of the set of subblocks according to a first second size of the respective sizes, including:

when the first subblock is located at a boundary of the current block, not extending the first subblock; and when the first subblock is not located at the boundary of the current block, extending each side of the first subblock by N samples.

10. The method of claim 1, wherein the respective sizes of the set of subblocks are adaptively selected for the optical flow refinement by extending the first subblock of the set of subblocks according to a second size of the respective sizes, including:

when the first subblock is located at a boundary of the current block, extending sides of the first subblock that are on an interior of the current block and not extending sides of the first subblock that are on the boundary of the current block; and when the first subblock is not located at the boundary of the current block, extending each side of the first subblock by N samples.

11. A computing system, comprising:

control circuitry;

memory; and one or more sets of instructions stored in the memory and configured for execution by the control circuitry, the one or more sets of instructions comprising instructions for:

receiving video data comprising a plurality of blocks, including a current block;

identifying a set of subblock motion vectors for the current block;

identifying a set of refined subblock motion vectors for the current block by applying an optical flow refinement on a set of subblocks of the current block, where respective sizes of the set of subblocks are adaptively selected for the optical flow refinement by extending a first subblock of the set of subblocks according to a first size of the respective sizes, including:

when the first subblock is located at a boundary of the current block, extending one or more first sides of the first subblock by N samples and padding one or more second sides of the first subblock; and when the first subblock is not located at the boundary of the current block, extending each side of the first subblock by N samples; and encoding the current block using the set of refined subblock motion vectors.

12. The computing system of claim 11, wherein the respective sizes of the set of subblocks are predefined.

13. The computing system of claim 11, wherein the respective sizes of the set of subblocks are derived or signaled.

14. The computing system of claim 11, wherein the respective sizes comprise a base size and a second size, wherein the second size corresponds to the base size with N additional columns and rows, N being a non-negative integer.

15. The computing system of claim 11, wherein the one or more sets of instructions further comprise instructions for padding one or more values for an extended size of a subblock located at a boundary of the current block.

16. A non-transitory computer-readable storage medium storing a video bitstream that is generated by a video encoding method and one or more instructions, the instructions when executed by a processor, cause a computing system to generate the video bitstream, the video bitstream comprising:

coded information for a plurality of blocks; and wherein the video encoding method comprises:

identifying a set of subblock motion vectors for the current block;

identifying a set of refined subblock motion vectors for the current block by applying an optical flow refinement on a set of subblocks of the current block, where respective sizes of the set of subblocks are adaptively selected for the optical flow refinement by extending a first subblock of the set of subblocks according to a first size of the respective sizes, including:

when the first subblock is located at a boundary of the current block, extending one or more first sides of the first subblock by N samples and padding one or more second sides of the first subblock; and when the first subblock is not located at the boundary of the current block, extending each side of the first subblock by N samples; and encoding the current block using the set of refined subblock motion vectors.

17. The non-transitory computer-readable storage medium of claim 16, wherein the respective sizes of the set of subblocks are predefined.

18. The non-transitory computer-readable storage medium of claim 16, wherein the respective sizes of the set of subblocks are derived or signaled.

19. The non-transitory computer-readable storage medium of claim 16, wherein the respective sizes comprise a base size and a second size, wherein the second size corresponds to the base size with N additional columns and rows, N being a non-negative integer.

* * * * *